United States Patent
Holdaway et al.

(10) Patent No.: US 7,743,124 B2
(45) Date of Patent: Jun. 22, 2010

(54) SYSTEM USING VITAL PRODUCT DATA AND MAP FOR SELECTING A BIOS AND AN OS FOR A SERVER PRIOR TO AN APPLICATION OF POWER

(75) Inventors: Kevan D. Holdaway, Raleigh, NC (US); Ivan Ronald Olguin, II, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 224 days.

(21) Appl. No.: 12/112,195

(22) Filed: Apr. 30, 2008

(65) Prior Publication Data

US 2009/0276512 A1 Nov. 5, 2009

(51) Int. Cl.
*G06F 15/177* (2006.01)

(52) U.S. Cl. ........................ 709/222; 709/220; 709/223

(58) Field of Classification Search ................. 709/222, 709/220, 223; 707/100; 715/223
See application file for complete search history.

(56) References Cited

U.S. PATENT DOCUMENTS 7,269,721 B2 9/2007 McCardle
2003/0210522 A1 11/2003 Rietze et al.
2004/0260936 A1 12/2004 Hiray et al.
2006/0031448 A1* 2/2006 Chu et al. .................... 709/223
2006/0136704 A1 6/2006 Arendt et al.
2007/0055753 A1* 3/2007 Robb .......................... 709/220
2007/0143462 A1* 6/2007 Venkatachalam et al. ... 709/223
2007/0150564 A1* 6/2007 Eldar et al. ................. 709/223
2007/0162582 A1* 7/2007 Belali et al. ................. 709/223
2007/0244994 A1* 10/2007 Bolan et al. ................. 709/220
2008/0195640 A1* 8/2008 Iszlai et al. ................. 707/100
2008/0222532 A1* 9/2008 Mester et al. ............... 715/738
2008/0250129 A1* 10/2008 Carpenter et al. ........... 709/223

* cited by examiner

*Primary Examiner*—Le Luu
(74) *Attorney, Agent, or Firm*—Griffiths & Seaton PLLC

(57) ABSTRACT

A method for selecting a basic input output system (BIOS) and an operating system (OS) for a server managed by a controller in communication with a plurality of servers is provided. The server is detected. A map describing a relationship between the server and the plurality of servers is consulted. The map at least partially defines a policy for the server. Vital product data (VPD) of the server is used in conjunction with the map and the policy to select at least one of the BIOS and the OS for the server prior to an application of power to the server.

20 Claims, 8 Drawing Sheets

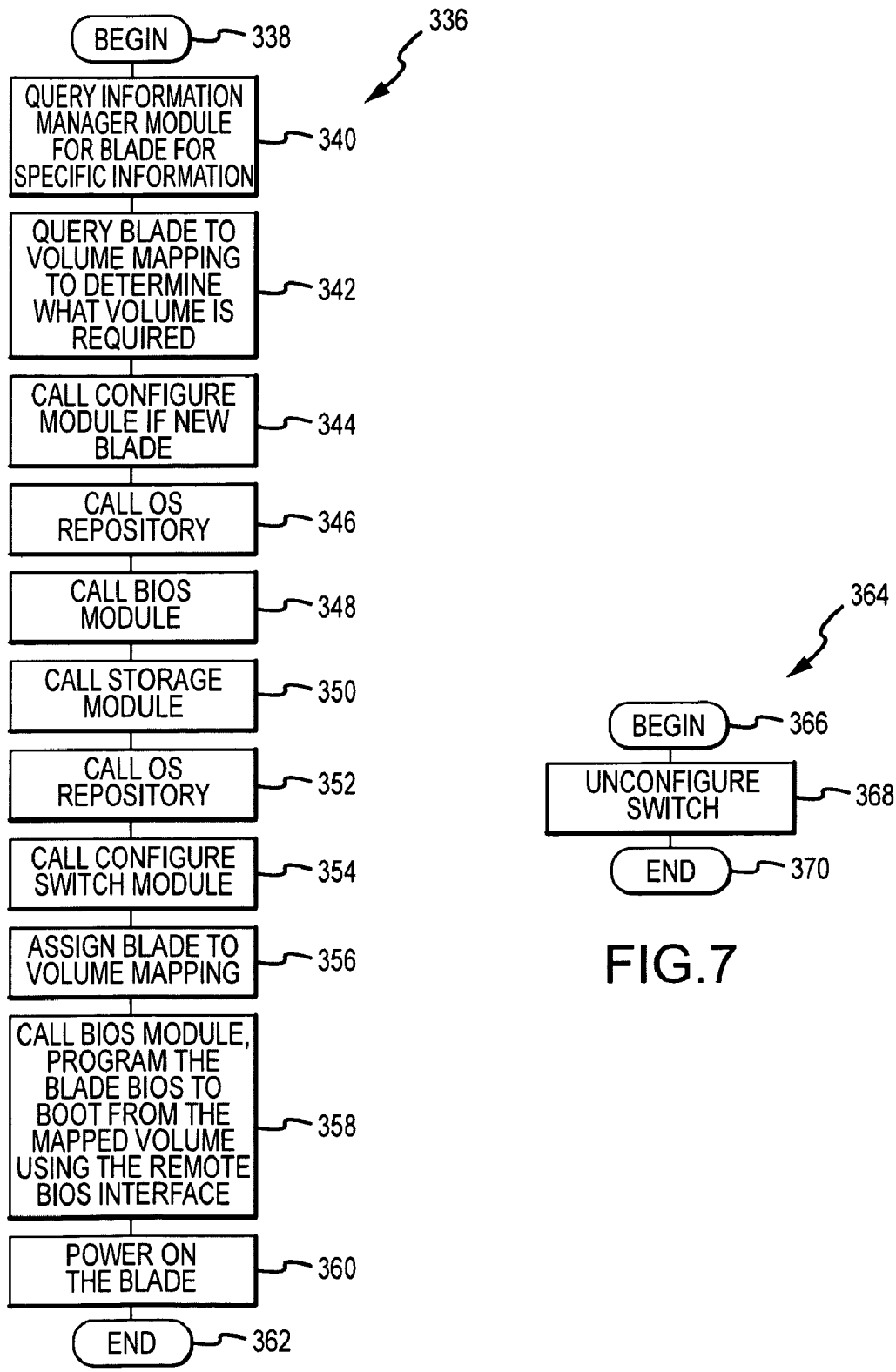

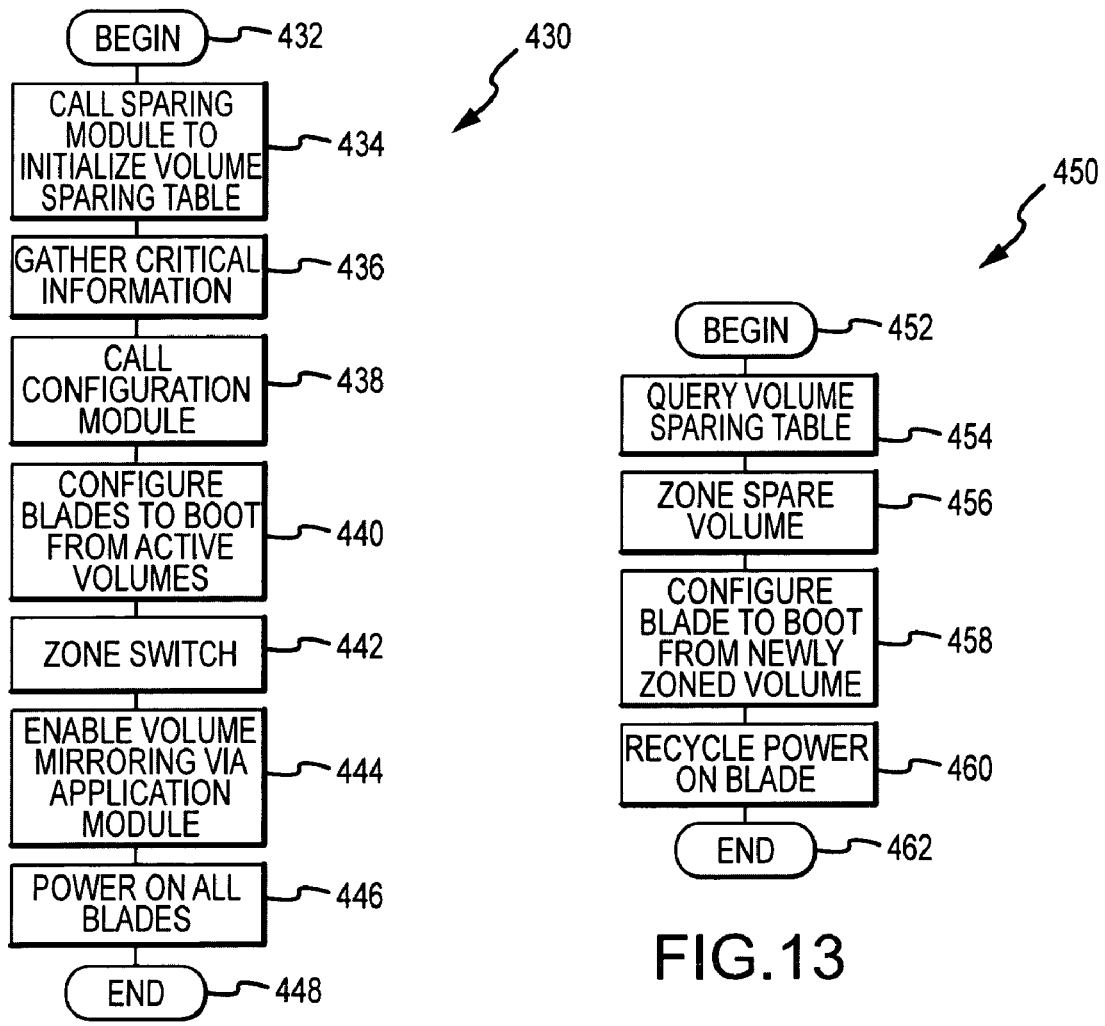

SYSTEM USING VITAL PRODUCT DATA AND MAP FOR SELECTING A BIOS AND AN OS FOR A SERVER PRIOR TO AN APPLICATION OF POWER

CROSS-REFERENCE TO RELATED APPLICATIONS

This application is related to U.S. Non-Provisional application Ser. Nos. 12/112,174 and 12/112,216 filed concurrently herewith and incorporated herein by reference.

BACKGROUND OF THE INVENTION

1. Field of the Invention

The present invention relates in general to computers, and more particularly to a method and computer program product for using vital product data (VPD) of a server in conjunction with a policy and map at least partially defining the policy to select a basic input output system (BIOS) and an operating system (OS) for a server.

2. Description of the Related Art

Multiple blade servers are computers that consolidate high-density server boards (blades) in a single blade chassis (server blade chassis). Typically, a server blade chassis accommodates multiple hot-swappable server blades. The operations of the blades may be supervised by management functionality sometimes embodied as a "management module." Management modules may include or may be associated with a processor for controlling input/output functions and interfacing with a network (such as the Internet or a Local Area Network).

Server blade chassis environments, housing a number of individual server blades, can provide flexibility in configuration and implementation of computing functionality for a user in a variety of settings, including business, government, and elsewhere. Such computing functionality may include processing functionality and storage functionality. As computing needs of a particular user may evolve over time, individual server blades may be configured and implemented to address these needs. For example, individual server blades may be implemented as storage blades or processor blades depending upon associated hardware for a particular application.

SUMMARY OF THE INVENTION

While management modules provide some existing control, interface, and processing functionality, currently there is an inability to use the management module to provide a collective, policy-based management scheme for a variety of individual server blades. For example, there is currently no centralized method to configure and manage the functions of a particular server blade's basic input output system (BIOS) per a specific policy within the management module. In another example, if the operating system of an application server blade resides on a particular volume (either on an associated storage blade or elsewhere), and the application server blade suffers from a hardware failure, the entire system fails. The user must then manually remap another server to point to the volume containing the operating system. There is currently no dynamic mapping management functionality in place.

In light of the foregoing, a need exists for a method, system, and computer program product for implementing a policy-based dynamic mapping of a plurality of resources operational on a plurality of servers. Accordingly, a method for selecting a basic input output system (BIOS) and operating system (OS) for a server managed by a controller in communication with a plurality of servers is provided. The server is detected. A map describing a relationship between the server and the plurality of servers is consulted. The map at least partially defines a policy for the server. Vital product data (VPD) of the server is used in conjunction with the map and the policy to select at least one of the BIOS and the OS for the server prior to an application of power to the server.

In another embodiment, by way of example only, a system for selecting a basic input output system (BIOS) and an operating system (OS) for a server managed by a management module, the management module in communication with the plurality of servers is provided. A configuration module is operational on the management module. The configuration module is adapted for detecting the server, consulting a map describing a relationship between the server and plurality of servers, the map at least partially defining a policy for the server, and using vital product data (VPD) of the server in conjunction with the map and the policy to select at least one of the BIOS and the OS for the server prior to an application of power to the server.

In another embodiment, again by way of example only, a computer program product for selecting a basic input output system (BIOS) and an operating system (OS) for a server managed by a controller in communication with a plurality of servers is provided. The computer program product comprises a computer-readable storage medium having computer-readable program code portions stored therein. The computer-readable program code portions comprise a first executable portion for detecting the server, a second executable portion for consulting a map describing a relationship between the server and the plurality of servers, the map at least partially defining a policy for the server; and a third executable portion for using vital product data (VPD) of the server in conjunction with the map and the policy to select at least one of the BIOS and the OS for the server prior to an application of power to the server.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 6 is a flow chart diagram of an exemplary blade insertion routine for an exemplary blade policy;

FIG. 7 is a flow chart diagram of an exemplary blade removal routine for an exemplary blade policy;

FIG. 12 is a flow chart diagram of an exemplary power-on routine for an exemplary volume sparing policy; and FIG. 13 is a flow chart diagram of an exemplary volume failure routine for an exemplary volume sparing policy.

DETAILED DESCRIPTION OF THE DRAWINGS

The present description and claimed subject matter describe exemplary system, method, and computer program product embodiments for implementing a policy-based management scheme using an advanced management module (AMM) within a blade server chassis. These embodiments use components of the multi-blade server, such as the aforementioned advanced management module, to centrally configure and manage policies and rules related to the execution of those policies. Further, the components may then execute and coordinate the execution of multiple policies in view of additional policies and rules. The components may be remotely accessible and configurable by use of software such as a web application over a network. Such embodiments provide for remote, centralized management and control of each blade in the chassis through an interface.

Figure 1:
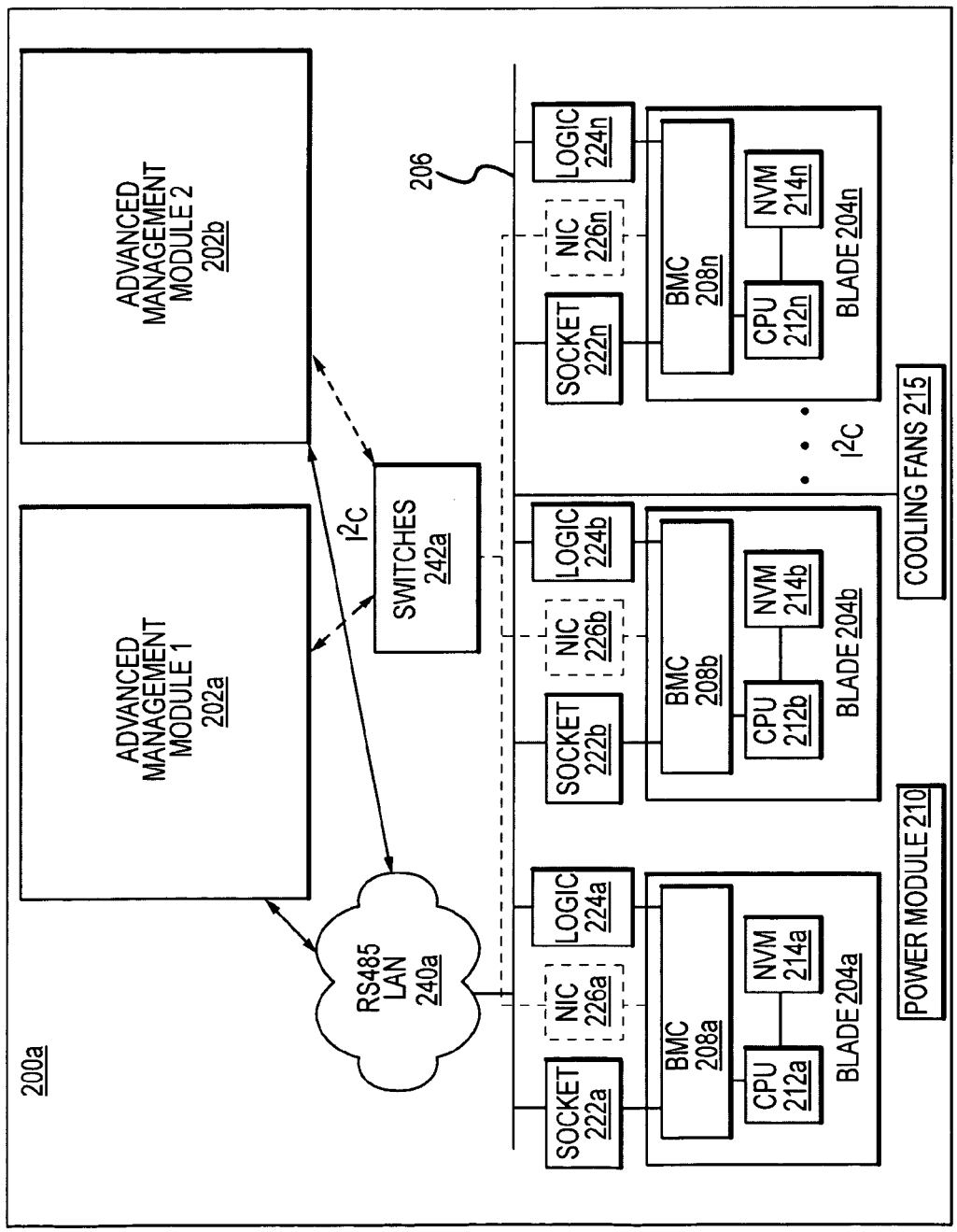
FIG. 1 depicts an exemplary server blade chassis incorporating an advanced management module (AMM) in which aspects of the claimed subject matter may be implemented.

FIG. 1 is an exemplary block diagram of a server blade chassis 200a. For the sake of clarity, only three server blades 204a,b,n are depicted. However, in one embodiment, server blade chassis 200a has a midplane 206 capable of connecting fourteen or more server blades 204.

Server blade chassis 200a has one or more advanced management modules 202. In the depicted embodiment, server blade chassis 200a has a primary advanced management module 202a and a back-up advanced management module 202b. Each advanced management module 202 is capable of managing multiple server blades 204. During normal operations, one of the local advanced management modules 202a or 202b are coupled to server blades 204a-n via a Local Area Network (LAN) 240a, a midplane 206, and a plurality of Baseboard Management Controllers (BMCs) 208 (each server blade 204 having a BMC 208) to form an in-band management pathway. LAN 240 and BMC 208 are discussed in further detail below.

Midplane 206 is a backplane, mounted in the middle of server blade chassis 200a, that contains circuitry and sockets 222 into which additional electronic devices or cards, including server blades 204 may be inserted. Midplane 206 contains at least one bus for secure in-band internal communication between management module 202 and server blades 204a-n, as well as between and among server blades 204a-n themselves, via respective BMCs 208a-n.

When a server blade 204 is inserted into a specific socket 222, a physical address is established for that server blade 204. For example, consider server blade 204a being inserted into socket 222a. A control logic 224a detects the presence of server blade 204a in socket 222a. Logic 224a may comport with the Electronics Industry Association (EIA) RS485 Standard for data communication. In other embodiments, Logic 224a may be compliant with the Phillips' Inter-IC (Inter-Integrated Circuit) standard (incorporated by reference in its entirety herein and commonly referred to as "I²C"), or with an Ethernet network standard. Logic 224a, operating in conjunction with management module 202, assigns a physical address on a bus in midplane 206 to server blade 204a when server blade 204a is inserted into socket 222a. Each server blade 204 may be associated with a unique logic 224 that is connected to midplane 206 as depicted in FIG. 2a. Alternatively, all server blades 204 may use a single logic 224.

Each server blade 204 may have a unique Internet Protocol (IP) address on midplane 206. That is, midplane 206 may support intercommunication using IP addressing protocol, in which each device connected or coupled to midplane 206 contains an IP address assigned by logic (not shown) that is either within or outside server blade chassis 200. For example, a Dynamic Host Configuration Protocol (DHCP) server may be used to assign an IP address to server blade 204a. Communication with server blade 204a is thereafter via a Network Interface Card (NIC) 226a that is associated with server blade 204a. The communication pathway using switches 242a and NICs 226 may be referred to as an out-of-band (OOB) network.

Each server blade 204 may have at least one central processing unit (CPU) 212, and a non-volatile memory (NVM) 214. NVM 214 is a Flash Read Only Memory ("Flash ROM" or "Flash Memory") that can be erased and reprogrammed in units of memory referred to as "blocks." NVM 214 may also include non-volatile Electrically Erasable Programmable Read Only Memory (EEPROM) that is similar to Flash Memory, except that EEPROM is erased and rewritten at the byte level and is usually smaller in capacity.

When a server blade 204 is shipped from a manufacturer, the NVM 214 may be pre-burned with firmware, including a BIOS as well as software for monitoring the server blade 204. Such monitoring may include controlling Direct Access Storage Devices (DASD's), monitoring and controlling voltages throughout the system, determining the power-on status of the server blade 204, requesting access to a shared keyboard, video, mouse, Compact Disk-Read Only Memory (CD-ROM) and/or floppy disk drives, as well as monitoring the Operating System (OS) running on the server blade 204.

As previously described, various related functionality in addition to traditional BIOS functionality may be associated with each blade 204a-n. This includes Extensible Firmware Interface (EFI) and (Firmware System Processor) FSP functionality. EFI is an emerging technology that provides a buffer between the operating system (OS) and the BIOS. For example, in a boot operation, the BIOS turns directly to EFI for pre-OS functions to be executed. EFI provides functionality a level of abstraction apart from the computer hardware. EFI may run an embedded Real Time Operating System (RTOS) that provides programmers with additional power and control over pre-OS functions. A FSP may contain system firmware and system code. As a result, FSP functionality relates to system functionality. For purposes of the instant description and claimed subject matter, reference to the term "BIOS" incorporates EFI and FSP functionality, as such functionality may be also centrally controlled and configurable using methodologies described herein.

Management modules 202 are capable of detecting the presence, quantity, type and revision level of each server blade 204, power module 210, and midplane 206 in the system. Management modules 202 may also directly control the operation of each server blade 204 and the power module 210, and may directly (without using the BIOS in the server blades 204) or indirectly (using the BIOS) control the operation of cooling fans 215 and other chassis 200a components.

Each server blade 204 has a Baseboard Management Controller (BMC) 208 that provides local supervisory control of the server blade 204 to which the BMC 208 is associated.

Each BMC 208 is able to communicate with a local management module 202 by either using communication path 240a (in-band network) or alternatively by using switches 242a and NICs 226 (out-of-band network). The local management modules 202a, 202b may utilize a variety of communications paths 240a, such as an RS485 path 240a, a LAN path 240a and an I²C path 240a to communicate with each blade 204.

LAN 240 is an in-band network also comporting with the Electronics Industry Association (EIA) RS485 Standard for data communication. Management modules 202 (either primary management module 202a or back-up management module 202b if management module 202a is down) communicate via LAN 240 with BMC 208, which includes logic for coordinating communication with server blades 204 via sockets 222. That is, the primary communication pathway between management module 202 and server blades 204 is the in-band network that comprises LAN 240, sockets 222, and BMC 208. The secondary communication pathway, which is used in the present invention if all of the local management modules 202 should fail, is the OOB network that comprises switches 242 and NICs 226.

LAN 240a may be configured to allow communications between server blades 204a-n and the management modules 202a, 202b relating to the remote BIOS settings and BIOS management. The blades 204a-n may leverage BMCs 208a-n as proxies to communicate with the management modules 202a, 202b through the RS485 protocol. Similarly, the management modules may leverage BMCs 208a-n as proxies to communicate with the blades 204a-n through the RS485 protocol. In an alternative embodiment, an RS485 connection may be separately made between each blade 204a-n and the management modules 202a, 202b. Additionally, other communications protocols and paths may be utilized, such as the aforementioned I²C channel or the aforementioned TCP/IP and/or Ethernet channel over switches 242a.

Figure 2:
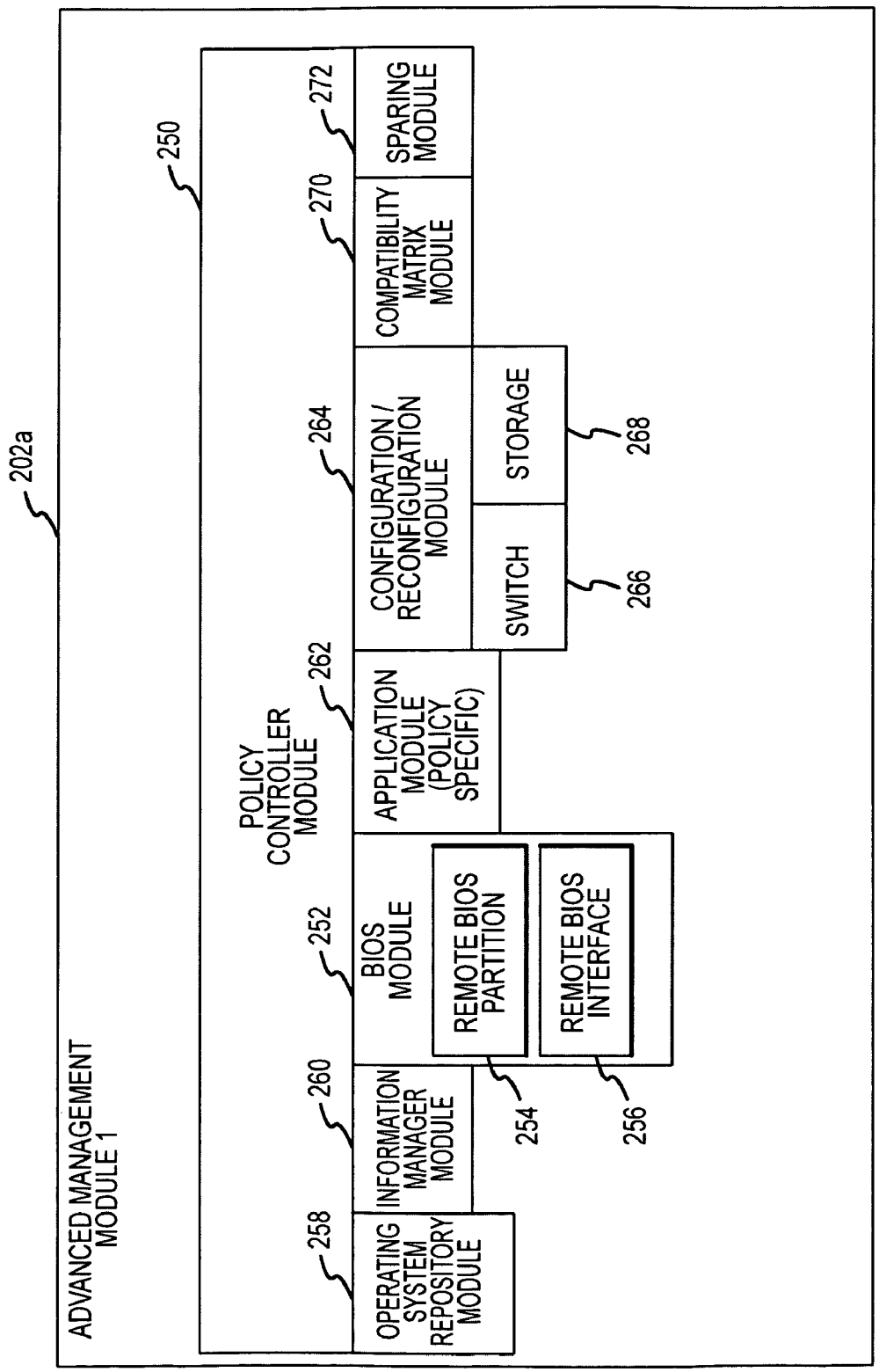
FIG. 2 is an block diagram of an exemplary advanced management module, including a policy controller module and associated sub-modules.

FIG. 2 depicts an exemplary advanced management module (AMM) 202a in further detail, incorporating a policy controller module 250 in communication with associated sub-modules as will be further described. Policy controller module 250 acts to define and initialize a number of blade-specific policies for a number of blades operational on a particular server blade chassis. A number of policies relevant to different aspects of operation of the various server blade devices may be defined. The definitions may be stored by the policy controller module 250 and located on the policy controller module 250, on another portion of the AMM 202a, or elsewhere. The policies may relate to management, operation, organization, and sparing, for example. Exemplary policies will be further described in more detail, following.

A number of definitions and rules relevant to the execution of each policy may be maintained and managed by the policy controller module 250. These rules may relate to or include certain "predetermined trigger" mechanisms, for example, that indicate to the AMM 202a that it is appropriate to execute a particular policy. The trigger mechanisms may include the action of inserting a new server blade device into the server blade chassis, or removing a server blade device from the server blade chassis. The trigger mechanism may include a failure of a hardware component within the server blade chassis, such as a server blade failure. As one skilled in the art will appreciate, a number of rules pertaining to a particular blade-specific policy may be maintained.

Policy controller module 250 coordinates the execution of multiple policies within the server blade chassis for a number of resources (e.g., storage resources) operational within the server blade chassis. For example, the policy controller module 250 may, as a result of a predetermined trigger such as a blade insertion, execute a first policy, e.g., a blade policy. An additional trigger mechanism such as a blade failure may result in the execution of a second policy, e.g., a blade sparing policy. The policy controller module 250 may execute the second policy in view of the rules of the second policy, as well as the rules of the first policy. In this manner, a variety of policies may be concurrently (or as the case may require, sequentially) executed on the AMM 202a as they pertain to an individual server blade.

A number of sub-modules are shown incorporated into the exemplary AMM 202a, although the number and functionality depicted is not exclusive and may vary depending on a particular implementation. In some cases, these sub-modules may be integrated together (physically or logically). In other cases, the sub-modules may be entitled differently, as much of the functionality described herein as applied to the sub-modules may be organized in various ways. In other cases, the sub-modules may be dispersed throughout the AMM 202a, or located elsewhere, yet remain in communication with the policy controller module 250.

Policy controller module 250, while coordinating the execution of one or more of the policies, may assign one or more of the definitions, rules, along with the policy itself, to a sub-module for execution. For example, a particular sparing policy, incorporating a number of sparing rules and definitions, may be assigned by the policy controller module 250 to a sparing sub-module for execution.

The depicted sub-modules as shown in FIG. 2 include a BIOS module 252 (including a remote BIOS partition 254 and a remote BIOS interface 256), an operating system repository module 258, an information manager module 260, an application module 262, a configuration/reconfiguration module 264 (including a configure switch module 266 and a configure storage module 268), a compatibility matrix module 270, and a sparing module 272. The depicted sub-modules as shown are in communication with each other, the policy controller module 250, and the AMM 202a.

The AMM 202a through the use of interfaces may be configured to retain a mapping of blades to BIOS settings maintained on information manager module 260, BIOS module 252, or elsewhere. Each newly inserted blade may be allocated a particular logical partition by BIOS module 254 for its particular BIOS settings. The BIOS settings may be stored in a standardized format. The AMM 202a may be configured to provide a new blade with a default set of BIOS settings/preferences.

To implement a remote BIOS, such as a BIOS for each blade of a multi-blade server as depicted in FIG. 1, a series of BIOS settings may be defined for each blade 204a-n. The settings may be configured to reside on a central management device and interface of the chassis such as an advanced management module 202a. Each blade's individual BIOS may be modified to always query the management module for blade-specific BIOS settings. The management module may then respond to the query with the blade-specific BIOS settings. The blade-specific BIOS settings could be initially set to default settings if a particular blade has never been inserted into the chassis 200a (FIG. 1). Alternatively, if the particular blade matches a set profile, the AMM 202a may provide a saved set of profile-specific BIOS settings. AMM 202a, 202b (FIG. 1) may be configured to communicate to each server blade both internally and externally (e.g., over an external network) via a particular chassis. In addition, the advanced management modules 202a, 202b may be adapted to be remotely configurable to simplify and minimize the interaction that the user has to have with respect to a particular server blade.

A remote BIOS partition 254 may be created within the AMM 202*a* for each blade (e.g., blades 204*a-n*) associated with the AMM 202*a*. Remote BIOS settings that are blade-specific may then reside in each remote BIOS partition. A central logical partition interface such as remote BIOS interface 256 may be implemented within the advanced management modules 202*a*, 202*b* (FIG. 1) adapted to control the BIOS (including EFI and FSP functionality) for each blade 204*a-n*. In addition, the remote bios interface 256 may be adapted to allow a user to remotely configure and modify settings such as the BIOS settings of a particular blade without the user having to enter a menu residing on the particular blade. Each blade 204*a-n* may be configured to cache the BIOS settings for cases when the AMM 202*a*, 202*b* (FIG. 1) are not accessible.

Operating system (OS) repository module 258 may store a number of operating systems which are designated for each of the server blades. For example, the operating system repository module 258 may store an Advanced Interactive Executive (AIX) operating system, as well as a Windows® based OS. In the event that an OS on boot designated volume is not present, the OS repository module 258 may initialize the volume with a designated OS. OS repository module 258 may perform various additional OS functionality as it pertains to a selected server blade.

Information manager module 260 may be configured to store and retrieve a variety of information relevant to a particular blade (such as mappings relevant to components of the particular blade), a particular policy for a selected blade, rules relevant to the execution of the policy, and the like. During the execution of a particular policy, the information manager module 260 may access, retrieve, and later store the information, definitions, rules, etc. During the execution of a particular policy, information manager module 260 may manage the flow of information between sub-modules and to/from the policy controller module 250. For example, a particular blade sparing policy may require a user input to designate whether a selected server blade will be assigned to be used live or as a spare. The user input may be elicited, retrieved, and stored by the information manager module 260.

Application module 262 may be employed by policy controller module 250 to execute various policy-specific applications. The applications may be used during the execution of a particular policy. Policy controller module 250 may control the use of these applications per the execution of a particular policy for a particular server blade or at a particular time. The applications may vary per the policy involved. For example, various applications may be used towards implementing a sparing policy for a selected server blade, and additional applications may be used towards implementing a BIOS policy for an additional server blade.

Configuration/reconfiguration module 264 is implemented to configure various resources within the server blade chassis, such as switch resources and storage resources. Accordingly, configure switch sub-module 266 and configure storage sub-module 268 may effect portions of various policies during their execution. The functionality of configuration module 264, as well as configure switch sub-module 266 and configure storage sub-module 268 will be further described as various steps in the execution of blade-specific policies is later illustrated.

Compatibility matrix module 270 is responsible for the implementation and maintenance of a compatibility matrix. The compatibility matrix describes compatibility relationships between server blade chassis resources. For example, a compatibility matrix, or a portion thereof, may be consulted to determine if a selected blade is compatible with a specified scheme or regime (e.g., sparing of certain volumes).

Sparing module 272 executes sparing policies, such as volume and blade sparing policies for a selected server blade within the server blade chassis. As with the various additional sub-modules described above, additional functionality with respect to the implementation of such sparing policies will be described below.

Figure 3:
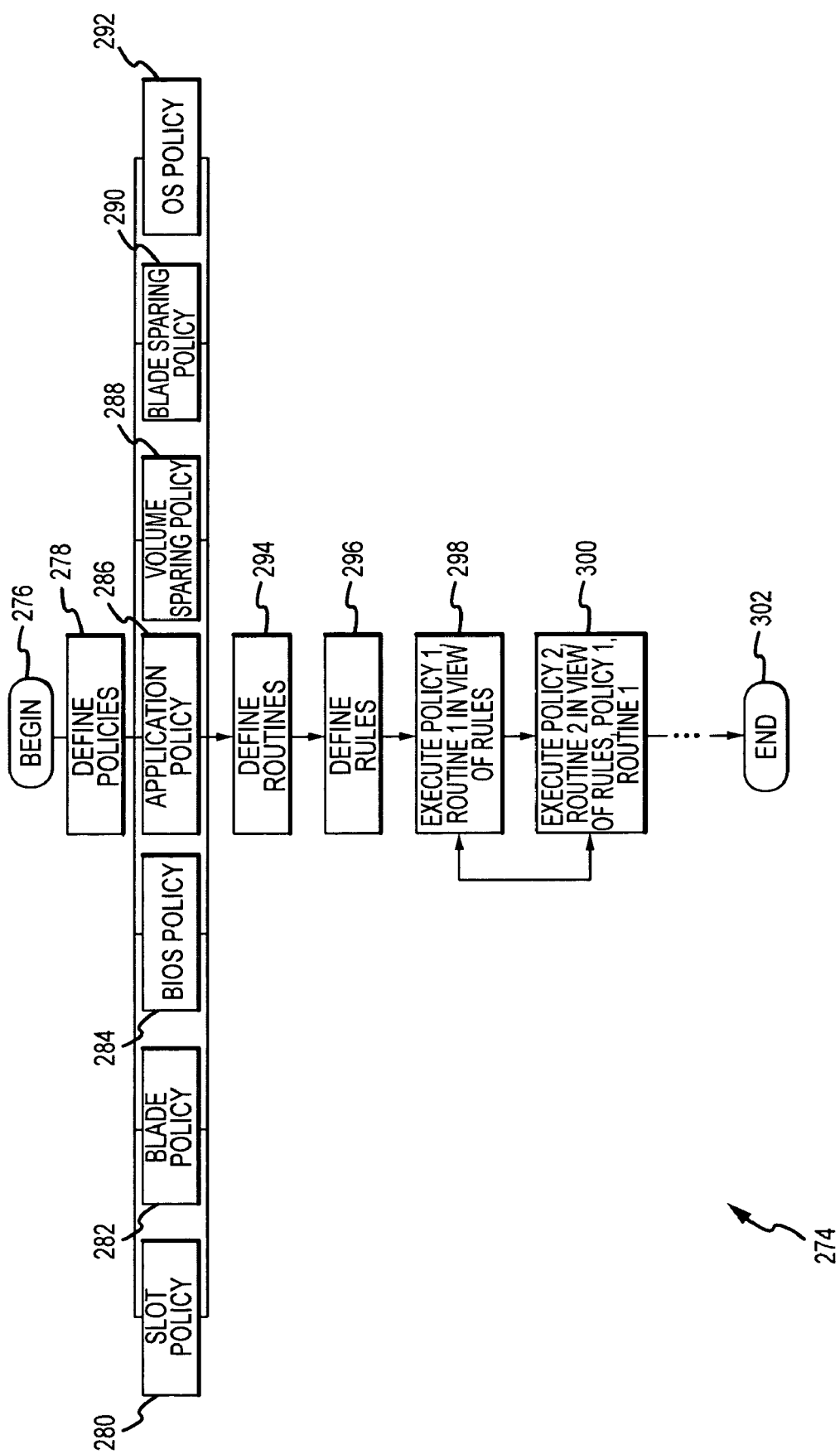
FIG. 3 is a flow chart diagram of an exemplary method of implementing and controlling a plurality of blade-specific policies within a server blade chassis.

Turning to FIG. 3, an exemplary method 274 for implementing and controlling a number of blade-specific policies within a server blade chassis is depicted. Method 274 begins (step 276) by defining a number of policies for execution on the server blade chassis in view of a particular implementation (step 278). In the depicted embodiment, a slot policy 280, a blade policy 282, a BIOS policy 284, an application policy 286, a volume sparing policy 288, a blade sparing policy 290, and an OS policy 292 are all defined. Again, however, the number of policies may vary depending on a particular situation.

Each of the various policies may be defined and initialized by the policy controller module. With respect to each of the various policies, a number of routines, subroutines, and the like, may be defined (step 294). For example, for a particular blade policy, a routine which executes upon the insertion of a blade into the server blade chassis, or blade insertion routine, may be defined. In another example, for a particular blade sparing policy, a routine which executes upon the detected failure of a selected server blade in the server blade chassis, or blade failure routine, may be defined.

A number of rules relevant to the execution of one or more policies may also be defined (step 296). The rules may relate to the order that particular steps in a particular policy are executed, for example. The rules may relate to the order that policies themselves are executed relative to additional policies or additional routines.

Once the number of policies, routines, and rules have been initialized and defined, the policy controller module may execute a first routine of a first policy, in view of the rules relevant to the execution of that policy (step 298). Policy controller module coordinates the execution of the first policy with the execution of a routine of a second policy, in view of applicable rules, and the first policy (step 300). The coordination of the execution of various policies may also depend on a variety of factors, such as time, usage, predetermined trigger mechanisms, customer input, external factors, and the like.

The policy controller module, depending on the situation, may execute a number of policies within a particular server blade chassis. Execution of these policies may be coordinated, one with another, until the various policies have been executed, and routines associated with the policies have been completed. The policy controller module may utilize a variety of information, including that obtained internal to the advanced management module, and elsewhere, to perform this coordination functionality. The policy controller module may coordinate onboard functionality with other subcomponents of the advanced management module, including various sub-modules or it may coordinate with other components within and/or without the server blade chassis. Once the coordination functionality has concluded, the method 274 then ends (step 302).

FIGS. 4-7, following, illustrate steps of various exemplary policies that feature and incorporate policy-based dynamic mapping functionality of resources within a server blade chassis. Such dynamic mapping functionality is made possible by such sub-modules as the information manager module 260, configuration modules 264, 266, and 268, and compatibility matrix module 270 (FIG. 2) in communication with other various sub-modules, and as coordinated by the policy controller module. The dynamic mapping functionality may incorporate one or more maps describing a relationship between two or more of the server blade chassis resources. The map may be maintained in the information manager module 260, or elsewhere.

As one skilled in the art will appreciate, various steps in the following methodologies may be implemented in differing ways to suit a particular application. In addition, the described methodologies may be implemented by various means, such as hardware, software, firmware, or a combination thereof operational on or otherwise associated with the server blade environment. For example, the mechanisms depicted in the following FIGS. 4-13 may be implemented, partially or wholly, as a computer program product including a computer-readable storage medium having computer-readable program code portions stored therein. The computer-readable storage medium may include disk drives, flash memory, digital versatile disks (DVDs), compact disks (CDs), and other types of storage mediums.

Figure 4:
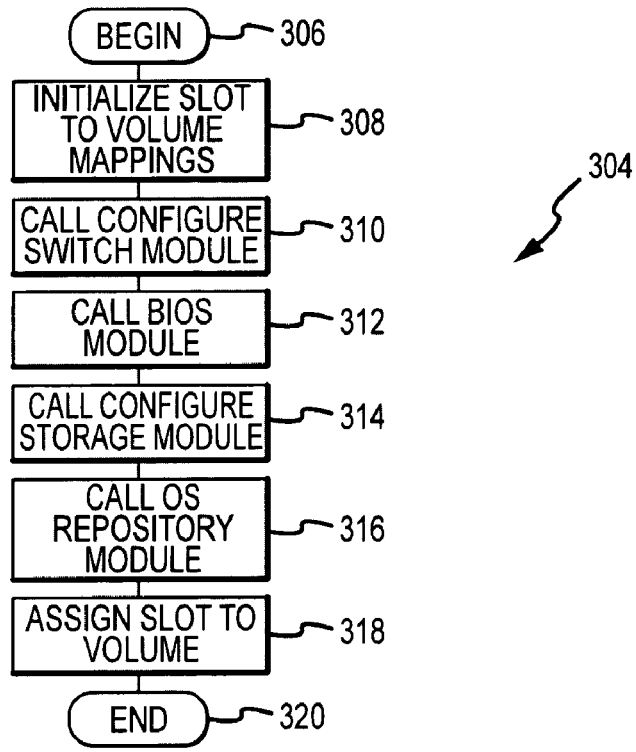
FIG. 4 is a flow chart diagram of an exemplary pre-insertion application routine for an exemplary slot policy.

FIG. 4 illustrates an exemplary pre-insertion application routine 304 of an exemplary slot policy. Prior to the insertion of a server blade in a selected slot of the server blade chassis, the policy controller module may complete the exemplary routine with the assistance of the various contributing sub-modules. As a first step, the routine 304 begins (step 306) with one or more slot-to-volume maps being initialized (step 308). Each of the slot-to-volume maps describe a relationship between a slot of the server blade chassis and a volume assigned to the slot.

As a next step, the configure switch module is called to complete the zoning setup requirements for an associated switch (step 310). The BIOS module is employed to make relevant BIOS assignments based on the slot-to-volume maps that were initialized (step 312). The configure storage module is called to allocate boot and data volumes for the selected slot if the boot and data volumes are determined to be not present (step 314). The OS repository module is called to set up an OS on the boot volume, again if the boot volume is determined to be not present (step 316). The allocation of boot and data volumes, as well as the configuration of a respective OS on the allocated boot volume may occur pursuant to a request. The selected slot is assigned to the volume(s) per the slot-to-volume mappings (step 318). The routine 304 then ends (step 320).

Figure 5:
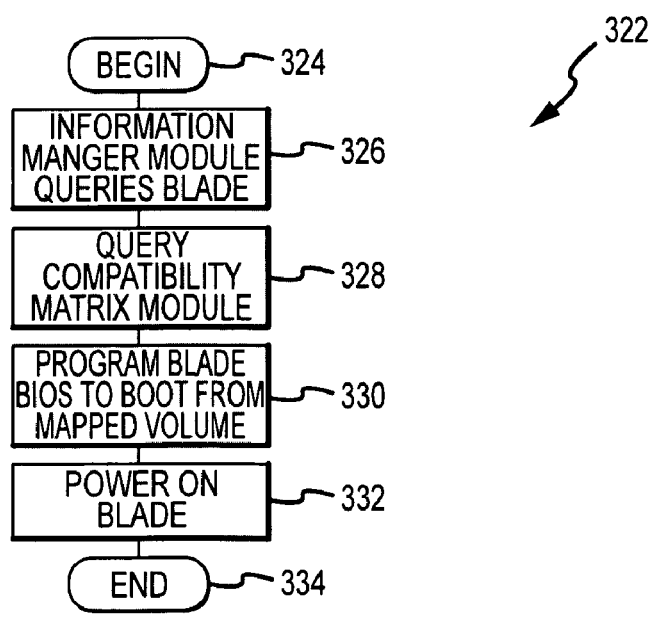
FIG. 5 is a flow chart diagram of an exemplary blade insertion routine for an exemplary slot policy.

FIG. 5 illustrates an exemplary blade insertion routine 322 of the exemplary slot policy first described in FIG. 4. The policy controller module, or a subcomponent, may observe that a blade has been inserted in a selected slot as a predetermined trigger mechanism. In response, the method 322 begins (step 324) by the information manager module querying the inserted blade for relevant information (step 326). This information may include, for instance, information such as vital product data (VPD) (including part numbers, serial numbers, and engineering change levels from either the Customized VPD object class or platform specific areas), compatibility information, application information, and so forth. For example, the routine may gather VPD from the inserted blade into the selected slot.

Based on the collected information, the compatibility matrix module is queried to obtain a compatibility relationship for the inserted blade in the selected slot (step 328). The inserted blade's BIOS is selected for the inserted blade by programming the selected BIOS to boot from the pre-mapped volume (based on the slot-to-volume map(s)) using the remote BIOS interface sub-module (step 330). If compatibility checks return without error, and the BIOS information is satisfactorily programmed, then the blade is powered on (step 332). The routine 322 then ends (step 334).

The methodology described in FIG. 5 illustrates an exemplary embodiment of slot policy functionality that, pursuant to a predetermined trigger (in this case, a blade insertion) reconfigures at least one of the resources of the server blade chassis. Throughout the following exemplary methodologies, it may be seen that a variety of server blade chassis resources may be similarly reconfigured pursuant to the execution of a particular policy or routine.

FIG. 6 illustrates an exemplary blade insertion routine 336 of an exemplary blade policy. Routine 336 begins (step 338) with a query, in response to a detection of the blade insertion, to the information manager module for specific information of the inserted server blade (step 340). A blade-to-volume map, maintained on the information manager module, is queried to determine which associated volume is required for the inserted server blade (step 342). If the inserted server blade is a new blade, then the configuration module functionality is implicated (step 344). Accordingly, the OS repository is called to obtain the blade's respective OS (step 346). The BIOS module is called to obtain the blade's BIOS based on a blade-to-BIOS mapping (step 348). Assuming the boot and data volumes are not present (due to a new blade), the configure storage module is called to allocate boot and data volumes for the particular slot (step 350). The OS repository is again called to set up the OS on the boot volume (step 352).

To perform appropriate zoning setup for an associated switch, the configure switch module is called (step 354). The blade-to-volume mapping returned from the information manager module is assigned to the inserted blade (step 356). The BIOS module is called, and the inserted blade's BIOS is programmed to boot from the mapped volume using the remote BIOS interface (step 358). Finally, the blade is powered on (step 360). Routine 336 then ends (step 362).

FIG. 7 illustrates an exemplary removal routine 364 of an exemplary blade policy. Routine 364 begins (step 366) with the detection of a blade removal from the server blade chassis. Following the detection of a blade removal, the switch is unconfigured in that the switch cannot access the previously assigned volume (step 368). The routine 364 then ends (step 370).

FIGS. 8-13, following, illustrate various routines for implementing exemplary sparing policies. Portions of the following methodologies may involve configuring a resource operational on the server blade chassis as a spare resource, configuring the sparing policy for the spare resource; and in response to observing a predetermined trigger for the spare resource, executing the sparing policy for the spare resource. The sparing policy executed, for example, may be a blade sparing policy or a volume sparing policy. The spare resource may be configured as such for at least one of a number of server blades.

An operating relationship between the spare resource and the number of server blades, such as a one-to-one relationship, a one-to-many relationship, and a many-to-many relationship, may be configured. The operating relationship may be based on a machine signature of the server blade, or based on a slot location in the server blade chassis.

Here, as before, one of a variety of predetermined trigger mechanisms may cause the execution of various policies and/or routines associated with those policies. For example, one predetermined trigger may be the detection of a selected server blade inserted in the server blade chassis. Once the insertion is detected, a sparing policy may be executed which, if the selected server blade is validated as a spare resource, may include maintaining the selected server blade in a standby, powered-off state.

In another example, a volume sparing policy may be defined to be executed following the detection of a volume failure. A first volume may be configured as a primary resource, and a second volume may be configured as a spare resource. Subsequent to detecting a volume failure, a zoning change on a switch associated with the first and second volumes may be requested. A BIOS associated with the first and second volumes may be updated with a correct boot location. The BIOS update may be facilitated in one embodiment by a Base Management Controller (BMC). A server blade associated with the second volume may be then powered on, and the second volume may be booted from.

Figure 8:
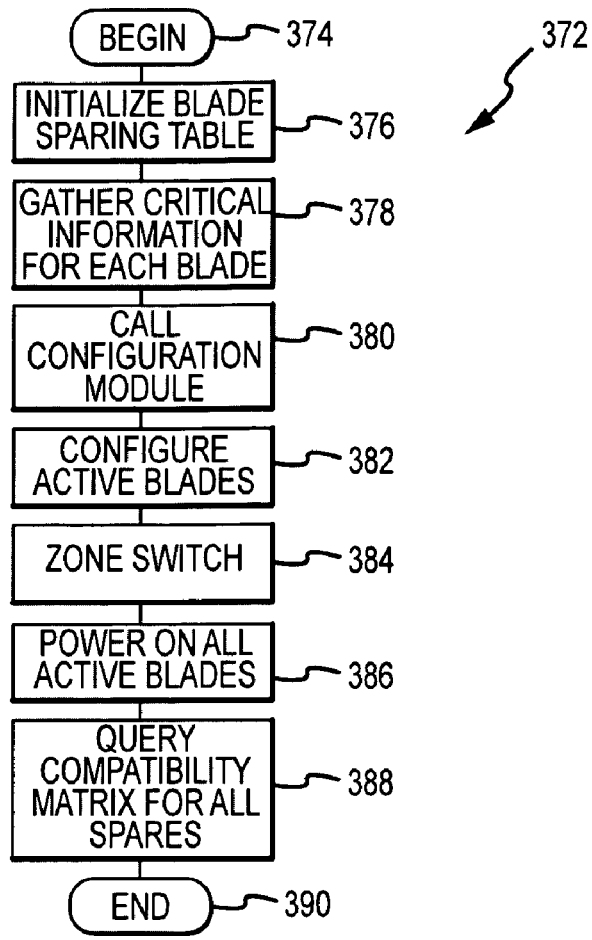
FIG. 8 is a flow chart diagram of an exemplary power-on routine for an exemplary blade sparing policy.

FIG. 8 illustrates an exemplary power-on routine 372 for an exemplary blade sparing policy. Routine 372 begins (step 374) by initializing a blade sparing table (step 376). The blade sparing table may be maintained on the information manager module, or elsewhere within the advanced management module. The blade sparing table may identify, for example, server blades designated as spares and additional server blades designated as live.

For each blade in the server blade chassis, the information manager module may be consulted to obtain crucial information required to perform various sparing operations (step 378). The configuration module may then be called (step 380). The configuration module may use the BIOS module to configure active blades to boot from correct volumes (step 382). The associated switch is then zoned such that active blades may access the appropriate volume (step 384). As a next step, all active blades are powered on (step 386). Server blades designated as spare resources are not powered on. The compatibility matrix is queried for all spare server blades (step 388). Those spare blades which are not compatible are then removed from the blade sparing table. Routine 372 then ends (step 390).

Figure 9:
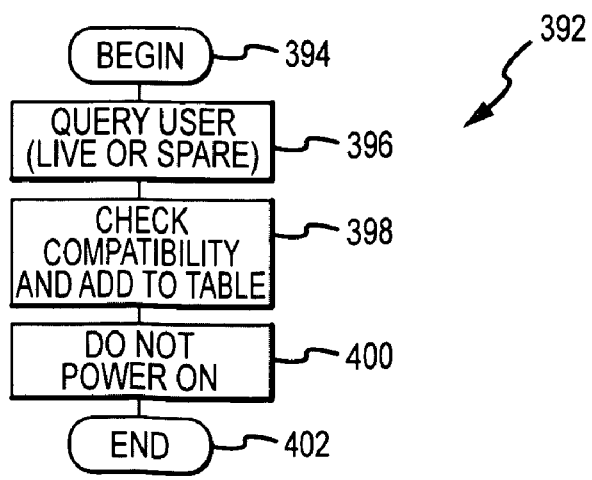
FIG. 9 is a flow chart diagram of an exemplary blade-insertion routine for an exemplary blade sparing policy.

FIG. 9 illustrates an exemplary blade insertion routine 392 for an exemplary blade sparing policy. Routine 392 begins (step 394) with a query to a user to determine if the user wishes a selected server blade to be a live or a spare resource (step 396). If the user designates the server blade as a spare, the user is again asked to specify the blade for confirmation. The routine 392 then checks the spare for compatibility (again using the compatibility matrix), and the spare is added to the blade sparing table (step 398). The spare is not powered on (Step 400). Routine 392 then ends (step 402).

Figure 10:
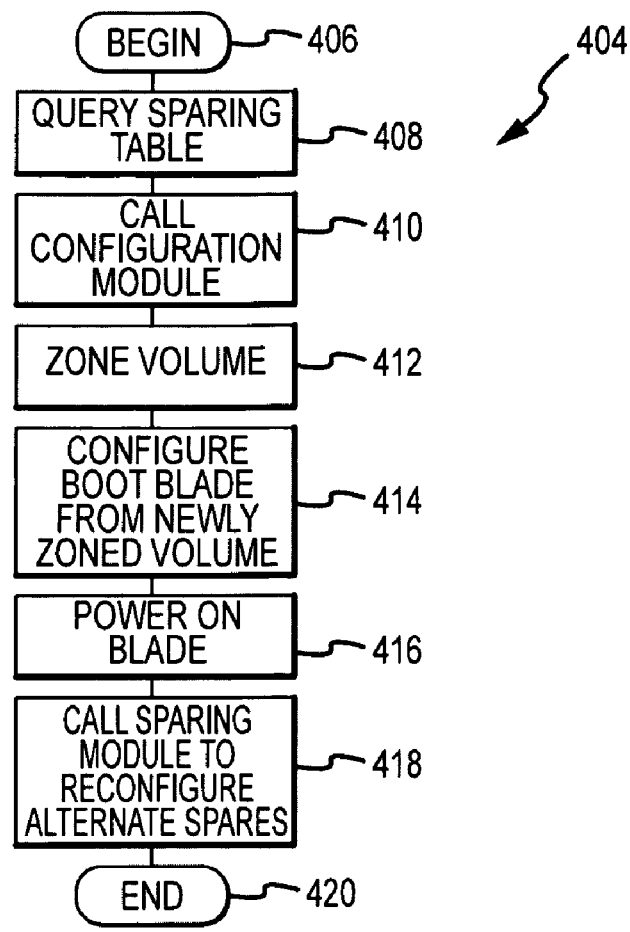
FIG. 10 is a flow chart diagram of an exemplary blade failure routine for an exemplary blade sparing policy.

FIG. 10 illustrates an exemplary blade failure routine 404 for an exemplary blade sparing policy. In response to the detection of a blade hardware failure, routine 404 begins (step 406) by querying the blade sparing table to determine which spare to use (step 408). The configuration module functionality is again implicated, and the configuration module is called (step 410). Using the configure switch module, the volume is zoned in order for the spare to "see" the device (step 412).

As a next step, the BIOS module is used to configure the spare server blade to boot from the newly zoned volume (step 414). The blade is powered on (step 416). The sparing module is called to reconfigure alternate spares to the new active blade (step 418). The routine 404 then ends (step 420).

Figure 11:
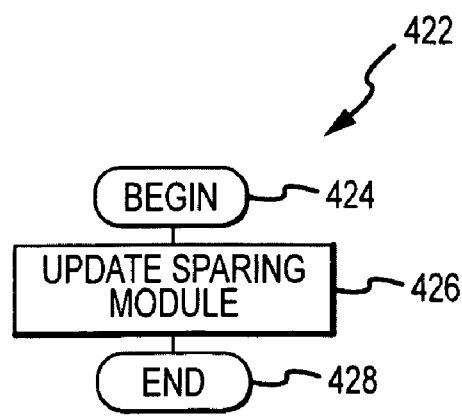
FIG. 11 is a flow chart diagram of an exemplary spare blade removal routine for an exemplary blade sparing policy.

FIG. 11 illustrates an exemplary blade removal routine 422 for an exemplary blade sparing policy. In response to the detection of a blade removal, routine 422 begins (step 424) by the sparing module being called to reconfigure alternate spares (since the instant blade is no longer accessible) (step 426). The routine 422 then ends (step 428).

FIG. 12 illustrates an exemplary power-on routine 430 for an exemplary volume sparing policy. Routine 430 begins (step 432) at power on to call the sparing module to initialize a volume sparing table (step 434). The volume sparing table functions similarly to the blade sparing table, in that particular volumes may be identified as designated spare or live volumes, for example. The volume sparing table may be maintained on the information manager module, on the sparing module, or elsewhere.

Once the volume sparing table is initialized, the information manager module may be consulted for each blade in the server blade chassis to gather critical system information, such as VPD (step 436). The configuration module functionality is implicated (step 438), and the BIOS module is used in conjunction with the configuration module to configure blades to boot from designated active volumes (step 440). The configure switch module is used to zone the associated switch (step 442). Using the configure storage module, volume mirroring may be enabled via the application module in order for all active and inactive volumes contain the same data (step 444). The blades are all powered on (step 446). The routine 430 then ends (step 448).

FIG. 13 illustrates an exemplary volume failure routine 450 for an exemplary volume sparing policy. Upon a detection of a volume failure, routine 450 begins (step 452) by querying the volume sparing table initialized during the execution of the power-on routine (step 454) to determine which spare volume to use. The spare volume is zoned using the configure switch module in order for the selected server blade to see the volume (step 456). Using the BIOS module, the blade is configured to boot from the newly zoned volume (step 458). As a next step, the blade power is recycled (step 460). The routine 450 then ends (step 462).

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Some of the functional units described in this specification have been labeled as modules in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for selecting a basic input output system (BIOS) and an operating system (OS) for a server managed by a controller in communication with a plurality of servers, comprising:
    detecting the server;
    consulting a map describing a relationship between the server and the plurality of servers, the map at least partially defining a policy for the server; and
    using vital product data (VPD) of the server in conjunction with the map and the policy to select at least one of the BIOS and the OS for the server prior to an application of power to the server.

2. The method of claim 1, further including configuring and storing the map on the controller.

3. The method of claim 1, wherein detecting the selected server includes detecting an insertion of the server into a slot.

4. The method of claim 1, wherein consulting a map describing a relationship between the server and the plurality of servers includes consulting a slot-to-volume map describing a relationship between a slot and a volume assigned to the slot.

5. The method of claim 4, further including configuring a compatibility matrix describing a compatibility relationship between an application and the server.

6. The method of claim 4, further including:
    determining if the volume exists,
    if the volume exists, modifying the BIOS of the server to point to the volume, and
    if the volume does not exist, providing a request that the volume be created.

7. The method of claim 1, wherein consulting a map describing a relationship between the server and the plurality of servers includes consulting a blade-to-volume map describing a relationship between the server and a volume assigned to the server.

8. The method of claim 1, wherein using vital product data (VPD) of the server in conjunction with the policy to select at least one of the BIOS and the OS for the server prior to an application of power to the server includes requesting a zoning change on a switch or updating the BIOS of the server with a boot location.

9. A system for selecting a basic input output system (BIOS) and an operating system (OS) for a server managed by a management module, the management module in communication with the plurality of servers, comprising:
    a configuration module operational on the management module, the configuration module adapted for:
        detecting the server,
        consulting a map describing a relationship between the server and plurality of servers, the map at least partially defining a policy for the server, and
        using vital product data (VPD) of the server in conjunction with the map and the policy to select at least one of the BIOS and the OS for the server prior to an application of power to the server.

10. The system of claim 9, further including an information manager module in communication with the configuration module, the information manager module adapted for consulting a slot-to-volume map describing a relationship between a slot of the server and a volume assigned to the slot.

11. The system of claim 10, further including a compatibility matrix module in communication with the information manager module, the compatibility matrix module adapted for configuring a compatibility matrix describing a compatibility relationship between an application and the server.

12. The system of claim 9, further including an information manager module in communication with the configuration module, the information manager module adapted for consulting a blade-to-volume map describing a relationship between the selected server and a volume assigned to the server.

13. The system of claim 12, further including a BIOS module in communication with the information manager module, the BIOS module adapted for:
    if the volume exists, modifying the BIOS of the selected server to point to the volume, and
    if the volume does not exist, providing a request that the volume be created.

14. The system of claim 9, wherein the configuration module is further adapted for requesting a zoning change on a switch or updating the BIOS of the server with a boot location prior to an application of power to the server.

15. A computer program product selecting a basic input output system (BIOS) and an operating system (OS) for a server managed by a controller in communication with a plurality of servers, the computer program product comprising a computer-readable storage medium having computer-readable program code portions stored therein, the computer-readable program code portions comprising:
    a first executable portion for detecting the server;
    a second executable portion for consulting a map describing a relationship between the server and the plurality of servers, the map at least partially defining a policy for the server; and
    a third executable portion for using vital product data (VPD) of the server in conjunction with the map and the policy to select at least one of the BIOS and the OS for the server prior to an application of power to the server.

16. The computer program product of claim 15, further including a fourth executable portion for configuring and storing the map on the controller.

17. The computer program product of claim 15, wherein the second executable portion for consulting a map describing a relationship between the server and the plurality of servers includes a fourth executable portion for consulting a slot-to-volume map describing a relationship between a slot and a volume assigned to the slot.

18. The computer program product of claim 15, wherein the second executable portion for consulting a map describing a relationship between the server and the plurality of servers includes a fourth executable portion for consulting a blade-to-volume map describing a relationship between the server and a volume assigned to the server.

19. The computer program product of claim 18, further including a fifth executable portion for:
    determining if the volume exists,
    if the volume exists, modifying the BIOS of the server to point to the volume, and
    if the volume does not exist, providing a request that the volume be created.

20. The computer program product of claim 15, wherein the third executable portion for using vital product data (VPD) of the server in conjunction with the policy to select at least one of the BIOS and the OS for the server prior to an application of power to the server includes a fourth executable portion for requesting a zoning change on a switch or updating the BIOS of the server with a boot location.

* * * * *